Sept. 11, 1934.　　　C. J. HUGHEY　　　1,973,483
CONTROL FOR POWER DRIVEN PHOTOGRAPHIC APPARATUS
Filed Aug. 31, 1931　　2 Sheets-Sheet 1
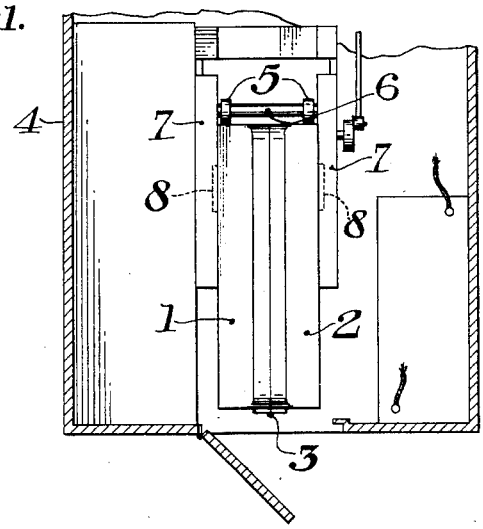
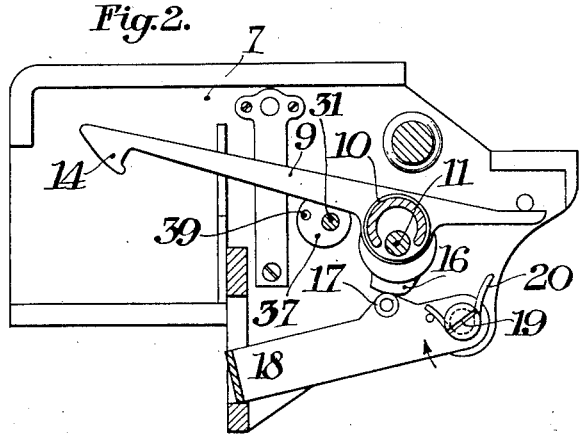
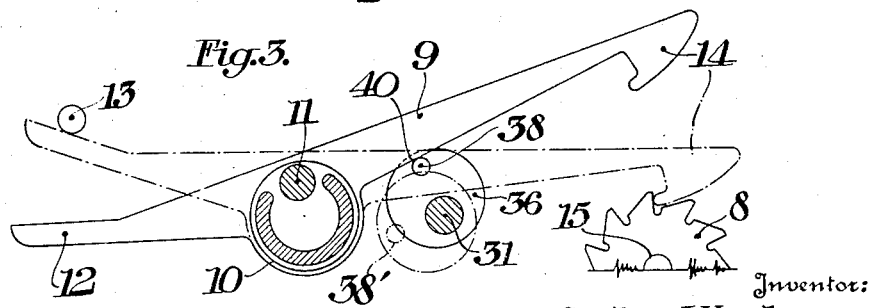
Inventor:
Carter J. Hughey,
Donald H. Stewart
By Newton M Perrin
Attorneys Sept. 11, 1934.   C. J. HUGHEY   1,973,483
CONTROL FOR POWER DRIVEN PHOTOGRAPHIC APPARATUS
Filed Aug. 31, 1931   2 Sheets-Sheet 2
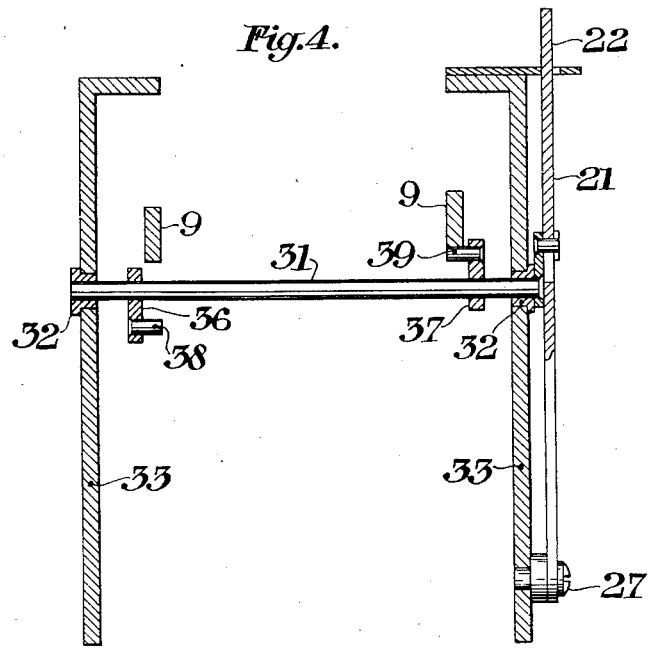
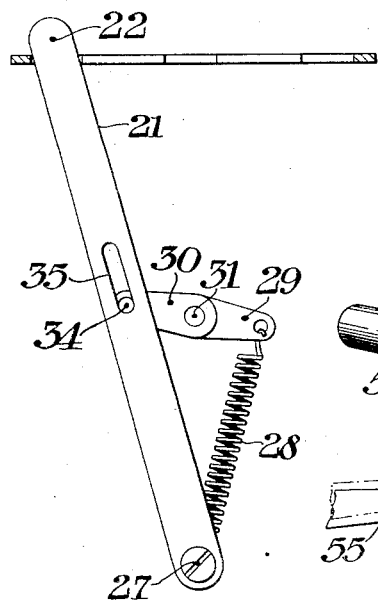
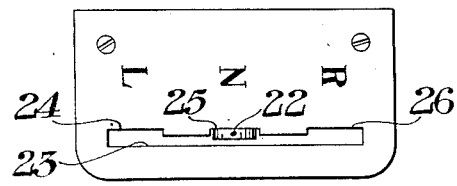
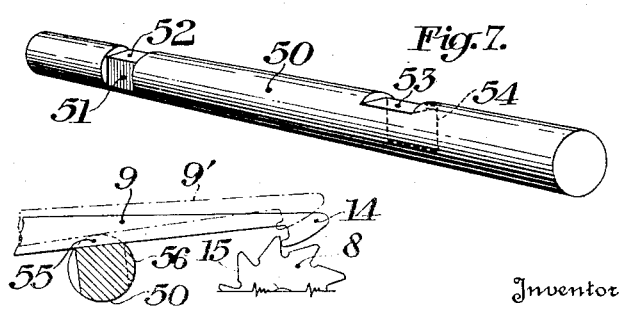
Inventor:
Carter J. Hughey, Patented Sept. 11, 1934

1,973,483

UNITED STATES PATENT OFFICE 1,973,483

CONTROL FOR POWER DRIVEN PHOTOGRAPHIC APPARATUS

Carter J. Hughey, Rochester, N. Y., assignor to Eastman Kodak Company, Rochester, N. Y., a corporation of New York Application August 31, 1931, Serial No. 560,386

5 Claims. (Cl. 88—17)

This invention relates to photography and more particularly to power driven photographic apparatus particularly adapted for photographing documents. One object of my invention is to provide a control for the power operated photographing mechanism which will permit making one or more than one record of the same documents at the same time. Another object of my invention is to provide a power drive for document photographing apparatus in which a part of the drive may be disconnected at the will of an operator. Another object of my invention is to provide a control for a "duplex" camera permitting the use of one or both sides of the "duplex" camera for making photographic records. Still another object of my invention is to provide a single control member by which the power operated mechanism may be connected and disconnected to the photographic apparatus and other objects will appear from the following specification, the novel features being particularly pointed out in the claims at the end thereof.

Coming now to the drawings wherein like reference characters denote like parts throughout:

Fig. 1 is a fragmentary horizontal section on the line I—I of Fig. 2, of a document photographing apparatus employing a control constructed in accordance with and embodying a preferred form of my invention;

Fig. 2 is a fragmentary side elevation illustrating parts of my invention;

Fig. 3 is a side elevation showing one control member in an operative position;

Fig. 4 is a detailed sectional view of the control mechanism which also shows the relation of the power operated members to the control mechanism;

Fig. 5 is a side elevation partially in section of the control member by which the various power operated members may be adjusted;

Fig. 6 is a top plan view of the control member locating plate;

Fig. 7 is a shaft which may be used in accordance with another embodiment of my invention; and Fig. 8 is a detailed view partially in section showing the shaft member in position to control a power operated member.

The document photographing apparatus may be of any well known type which may employ a "duplex" camera—that is, a camera adapted to contain two films to make two records simultaneously of an object being photographed. Such a camera is preferably of the type shown in U. S. Patent No. 1,730,930, E. C. Fritts, October 8, 1929. For the film supporting and moving mechanism adapted to operate such a camera reference may be had to U. S. patent application, Serial No. 415,461, E. C. Fritts, filed December 20, 1929.

As shown in the patent above referred to the "duplex" camera may consist of a pair of cameras 1 and 2 which contain film reels 1' and 2', respectively, which are hinged at 3 and which are adapted to be supported in a housing 4 by means of hooks 5 which may engage a rod 6 supported between the side plates 7.

Each of the cameras 1 and 2 is provided with a ratchet 8, the ratchet lying inside of the member 7 in position to be engaged and moved by the pawls 9.

The pawls 9 as best shown in Fig. 3 may be mounted upon an eccentric 10 carried by a shaft 11 and may have a tail 12 in one position adapted to engage a pin 13 and a hook 14 adapted to engage the ratchet 8. The shaft 11 may be driven from a suitable source of power so that the pawl 9 is a power driven member which is adapted to transmit motion to the ratchet 8 which turns shaft 15, this shaft operating the camera mechanism as described in the patent above referred to.

The shaft 11 which operates the eccentric 10 also carries a cam 16 against which a roller 17 is adapted to oscillate a shutter 18 about a pivot 19. The shutter 18 is normally thrust in the direction shown by the arrow by means of a spring 20 which keeps the cam roller 17 in contact with the cam 16.

As thus described the mechanism is the same as that shown in the patent above referred to and in the application, Serial No. 415,461.

In order to control the operation of the "duplex" cameras independently or together the following mechanism has been provided. A control member 21 as best shown in Fig. 5 and Fig. 6 has an operating end 22 adapted to move through a slot 23 which is notched at 24, 25 and 26. Opposite these notches are the letters L, N and R, L standing for left, N standing for neutral and R standing for right. When the lever is moved to position L only the left hand camera will operate, when moved to neutral both cameras will operate, and when moved to R only the right camera will operate.

The mechanism for accomplishing this result is as follows: The arm 21 is pivoted to turn upon a stud 27 to which a spring 28 is attached, this spring also engaging an arm 29 of a lever 30 attached to a shaft 31 which is supported in suitable bearings 32 in the side plates 33.

Lever 30 is provided with a pin 34 extending into the slot 35 in lever 21 in such a manner that when the lever is moved between the notches L, N and R shaft 31 will be rotated through slightly less than 180°.

The shaft 31 supports a pair of similar cams 36 and 37 which are arranged unsymmetrically with respect to each other. Cam 36 is provided with a pin 38 and cam 37 is provided with a pin 39, these pins in certain positions being adapted to engage the hooks 9 which operate the cameras through engagement with ratchets 8. As indicated in Fig. 4 pin 39 is in engagement with one ratchet 9 while pin 38 is out of engagement with the opposite ratchet. Thus with the parts arranged as shown in this figure only the hook 9 on the left hand side of the figure would be in position to engage a ratchet and thus only the left camera would be operated.

By shifting the handle 22 to the position indicated at N—neutral—both of the pins 38 and 39 would lie out of engagement with the ratchet members so that both cameras would operate. By shifting the lever still further to R pin 38 would engage the left hand ratchet 9 and raise it from an operative position while the right hand ratchet 9 might engage and drive its ratchet.

As indicated in Fig. 3 the pin 38 is in engagement with an edge 40 of the ratchet 9 and thus while the ratchet continues to move under the impulse of the eccentric 10 which is operated by power by means of shaft 11 the power of movement is such that the hook 14 cannot touch the ratchet 8. When however the shaft 31 is turned by the handle 22 the pin 38 moves downwardly into the position shown at 38' in which the hook 14 is free to move to a position in which it engages the ratchet 8.

While the above described embodiment of my invention is entirely satisfactory, a simpler form as shown in Figs. 7 or 8 can be easily arranged in place of the shaft 31. I provide a shaft of large diameter 50, this shaft being affixed to the lever 30 and the control member 31 in the same way shaft 31 is interconnected therewith. Shaft 50 in place of the cams 36 and 37 bearing the contacting pins 38 and 39 is provided with flat faces 51 and 52 on one side and 53 and 54 on the other side. Faces 52 and 53 lie in the same plane and when both of these faces lie beneath the hooks 9, both hooks are free to operate and by engaging the ratchets 8 on the shafts 15 operate the two cameras. When, however, the shaft 50 is turned so that a portion 55 of the hook 9 engages a rounded portion 56 of the rod 50, the hook will be moved to the position shown in the dot and dash lines at 9' in Fig. 8 in which it cannot engage the ratchet 8. By moving the lever 22 so that a flat face 51 or 54 lies beneath a hook the right or left hand camera may be operated. By moving the lever 22 to a neutral position, the flat faces 52 and 53 will lie beneath the hooks and both pawls may be operated.

While I have shown preferred forms of my power drive control for automatic photographing machines, obviously my invention is susceptible to various forms and I contemplate as within the scope of my invention all such forms as may come within the terms of the appended claims.

What I claim is:

1. In a device of the character described, the combination with a pair of cameras and a power drive including a pair of driving members adapted individually and simultaneously to operate said cameras, of a single manual control means adapted to cooperate with either of said driving members and adapted alternatively to maintain either driving member out of engagement with the corresponding camera.

2. In a device of the character described, the combination with a pair of cameras, and a power drive including a pair of driving members adapted individually and simultaneously to operate said cameras, of a control means manually movable to one of three positions, adapted in two of said positions to cooperate with one of said driving members and to interrupt alternatively the operation of either camera, and adapted in the other position to permit simultaneous operation of said cameras.

3. In a device of the character described, the combination with a pair of cameras, and a power drive including a pair of driving members adapted individually and simultaneously to operate said cameras, of a control means manually movable to either of two extreme positions and into a middle position, adapted in either of said extreme positions to cooperate with one of said driving members and to interrupt alternatively the operation of either camera, and adapted in said middle position to permit simultaneous operation of said cameras.

4. In a device of the character described, the combination with a pair of cameras each having a film advancing member and a pair of pawls adapted individually and simultaneously to engage said film advancing members, of a control means manually movable and including a pair of angularly displaced eccentric members adapted alternatively to cooperate with said pawls and to prevent one of them from engaging the corresponding film advancing member.

5. In a device of the character described, the combination with a pair of cameras each having a film advancing member and a pair of pawls adapted individually and simultaneously to engage said film advancing members, of a control means manually movable and including a shaft provided with a pair of semi-squared portions in quadrature with respect to each other, said portions being adapted alternatively to cooperate with said pawls and to prevent one of them from engaging the corresponding film advancing member.

CARTER J. HUGHEY.